US012565081B2

(12) United States Patent (10) Patent No.: US 12,565,081 B2
Pabisz, Jr. et al. (45) Date of Patent: Mar. 3, 2026

(54) AIR CONDITIONING SYSTEM FOR A VEHICLE

(71) Applicant: Dometic Sweden AB, Solna (SE)

(72) Inventors: Ronald A. Pabisz, Jr., Boynton Beach, FL (US); Eric Schuh, Stevensville, MI (US); Justin Aaron Celauro, Deerfield Beach, FL (US)

(73) Assignee: Dometic Sweden AB, Solna (SE)

( * ) Notice: Subject to any disclaimer, the term of this patent is extended or adjusted under 35 U.S.C. 154(b) by 108 days.

(21) Appl. No.: 18/262,883

(22) PCT Filed: Jan. 25, 2022

(86) PCT No.: PCT/IB2022/050651
§ 371 (c)(1),
(2) Date: Jul. 25, 2023

(87) PCT Pub. No.: WO2022/162534
PCT Pub. Date: Aug. 4, 2022

(65) Prior Publication Data
US 2024/0308298 A1 Sep. 19, 2024

Related U.S. Application Data

(60) Provisional application No. 63/141,800, filed on Jan. 26, 2021.

(51) Int. Cl.
B60H 1/32 (2006.01)
B60H 1/00 (2006.01)

(52) U.S. Cl.
CPC ....... B60H 1/3222 (2013.01); B60H 1/00364 (2013.01); B60H 1/00428 (2013.01); B60H 1/3226 (2013.01)

(58) Field of Classification Search
CPC .............. B60H 1/3222; B60H 1/00364; B60H 1/00428; B60H 1/3226
See application file for complete search history.

(56) References Cited

U.S. PATENT DOCUMENTS 3,077,084 A * 2/1963 De Kanter ............ F24F 13/224
62/278
3,404,537 A * 10/1968 Leonard, Jr. ............ F25B 27/00
203/25
(Continued)

FOREIGN PATENT DOCUMENTS

AU 2004202967 B2 12/2010
AU 2007200788 B2 6/2011
(Continued)

OTHER PUBLICATIONS

"How To Fix a Common A/C Problem for Under $10", Available online at: www.passagemakercom/the-vetus-maxwell-workbench/how-to-fix-a-common-ac-problem-for-under-10-bucks, Jul. 8, 2020.
(Continued)

*Primary Examiner* — Marc E Norman
(74) *Attorney, Agent, or Firm* — Dinsmore & Shohl LLP

(57) ABSTRACT

Present embodiments relate to an air conditioning system for a vehicle. More specifically, but without limitation, present embodiments relate to a vehicle air conditioning system which comprises a variable speed motor and a controller which is capable of auto selecting an input current and which auto tunes according to the AC or DC voltage presented at the input. A controller is also provided which is capable of controlling two or more motors for an air conditioning system.

18 Claims, 7 Drawing Sheets

(56) References Cited

U.S. PATENT DOCUMENTS

| | | | |
|---|---|---|---|
| D226,381 S | 2/1973 | Harty, Jr. | |
| 3,888,090 A * | 6/1975 | Meyer | F24F 13/224 |
| | | | 62/426 |
| D284,025 S | 5/1986 | Armstrong | |
| 4,641,502 A | 2/1987 | Aldrich | |
| 4,672,818 A | 6/1987 | Roth | |
| 4,709,623 A | 12/1987 | Roth | |
| D300,777 S | 4/1989 | Bales | |
| D306,341 S | 2/1990 | Bales | |
| 5,531,641 A | 7/1996 | Aldrich | |
| 5,848,536 A | 12/1998 | Dodge et al. | |
| 6,026,653 A | 2/2000 | Presnell | |
| 6,088,959 A | 7/2000 | Wait et al. | |
| 6,213,197 B1 | 4/2001 | Ebbeson | |
| 6,263,689 B1 | 7/2001 | Dodge et al. | |
| 6,276,152 B1 | 8/2001 | Sibik | |
| 6,414,399 B1 * | 7/2002 | Bianchi | B63J 2/02 |
| | | | 290/1 A |
| 6,449,973 B2 | 9/2002 | Dodge et al. | |
| 6,460,356 B1 | 10/2002 | Tao et al. | |
| 6,470,960 B2 | 10/2002 | Kampf et al. | |
| 6,523,361 B2 | 2/2003 | Higashiyama | |
| 6,646,411 B2 | 11/2003 | Hirono et al. | |
| 6,684,944 B1 | 2/2004 | Byrnes et al. | |
| 6,695,046 B1 | 2/2004 | Byrnes et al. | |
| 6,772,833 B2 | 8/2004 | Auer et al. | |
| 6,857,953 B2 | 2/2005 | Malott | |
| 6,886,350 B2 | 5/2005 | Petesch et al. | |
| 6,916,161 B2 | 7/2005 | Brunner et al. | |
| 6,955,060 B2 | 10/2005 | Homan et al. | |
| 7,007,857 B2 | 3/2006 | Enander et al. | |
| 7,140,192 B2 | 11/2006 | Allen | |
| 7,152,421 B2 | 12/2006 | Parks et al. | |
| 7,171,822 B2 | 2/2007 | Allen | |
| 7,191,826 B2 | 3/2007 | Byrnes et al. | |
| 7,234,315 B2 | 6/2007 | Allen | |
| 7,237,397 B2 | 7/2007 | Allen | |
| 7,240,502 B2 | 7/2007 | Cho et al. | |
| 7,305,291 B2 | 12/2007 | Koenig et al. | |
| 7,316,119 B2 | 1/2008 | Allen | |
| 7,353,084 B2 | 4/2008 | Schaper et al. | |
| 7,412,841 B2 | 8/2008 | Ueda et al. | |
| 7,419,368 B2 | 9/2008 | Milks | |
| 7,434,612 B2 | 10/2008 | Alberternst et al. | |
| D588,479 S | 3/2009 | Giese | |
| 7,578,341 B2 | 8/2009 | Ichishi et al. | |
| 7,640,767 B2 | 1/2010 | Schnetzka et al. | |
| 7,739,882 B2 | 6/2010 | Evans | |
| 7,832,464 B2 | 11/2010 | Kinmartin et al. | |
| 7,835,835 B2 | 11/2010 | Wakiyama et al. | |
| 7,963,117 B2 | 6/2011 | Allen | |
| 8,056,351 B2 | 11/2011 | Marciano et al. | |
| D661,386 S | 6/2012 | Bergin | |
| 8,240,168 B2 | 8/2012 | Holguin | |
| 8,256,239 B2 | 9/2012 | Buzzi | |
| 8,382,563 B2 | 2/2013 | Sievers et al. | |
| 8,400,090 B2 | 3/2013 | Marcinkiewicz et al. | |
| 8,418,490 B2 | 4/2013 | Lee | |
| 8,440,143 B2 | 5/2013 | Liptak | |
| 8,535,127 B2 | 9/2013 | Malott | |
| 8,555,669 B1 | 10/2013 | Leblanc et al. | |
| 8,568,209 B2 | 10/2013 | Boxum | |
| 8,744,673 B2 | 6/2014 | Shiroyama et al. | |
| D712,531 S | 9/2014 | Bergin | |
| 8,827,171 B2 | 9/2014 | Choi et al. | |
| 8,839,632 B2 | 9/2014 | Goenka et al. | |
| 8,849,487 B2 | 9/2014 | Malone et al. | |
| D715,907 S | 10/2014 | Bergin | |
| D716,925 S | 11/2014 | Bergin | |
| 8,881,544 B2 | 11/2014 | Buzzi | |
| 8,958,949 B2 | 2/2015 | Verwoert et al. | |
| 8,969,766 B2 | 3/2015 | Mcgaugh | |
| 8,973,387 B2 | 3/2015 | Osaka et al. | |
| 9,045,043 B2 | 6/2015 | Hoke et al. | |
| 9,061,567 B2 | 6/2015 | Kwon et al. | |
| 9,170,037 B2 | 10/2015 | Leblanc et al. | |
| 9,206,994 B2 | 12/2015 | Matsuo et al. | |
| 9,447,997 B2 | 9/2016 | Kyle et al. | |
| 9,504,116 B2 | 11/2016 | Choi et al. | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin | |
| 9,738,136 B2 | 8/2017 | Boss et al. | |
| 9,776,470 B2 | 10/2017 | Wang et al. | |
| 9,783,024 B2 | 10/2017 | Connell et al. | |
| 9,797,294 B2 | 10/2017 | Yin et al. | |
| 9,862,247 B2 | 1/2018 | Perkins | |
| D811,566 S | 2/2018 | Liu | |
| 9,937,990 B2 | 4/2018 | Yin et al. | |
| D817,466 S | 5/2018 | Moseley | |
| 9,975,405 B2 | 5/2018 | Siddiqui | |
| 9,981,526 B2 | 5/2018 | Herrmann et al. | |
| D824,499 S | 7/2018 | Williamson | |
| 10,082,345 B1 | 9/2018 | Mihail | |
| 10,093,152 B2 | 10/2018 | Allard | |
| 10,107,526 B2 | 10/2018 | Xie et al. | |
| 10,173,497 B2 | 1/2019 | Sawyer et al. | |
| D841,138 S | 2/2019 | Williamson | |
| 10,208,991 B2 | 2/2019 | Hatakeyama et al. | |
| 10,295,239 B2 | 5/2019 | West et al. | |
| D850,609 S | 6/2019 | Bergin | |
| 10,400,658 B2 | 9/2019 | Yin et al. | |
| 10,415,858 B2 | 9/2019 | Tropea | |
| 10,421,333 B2 | 9/2019 | Kim et al. | |
| D862,668 S | 10/2019 | Moseley | |
| 10,427,497 B2 | 10/2019 | Kami | |
| 10,451,326 B2 | 10/2019 | Schreiber | |
| 10,457,116 B2 | 10/2019 | Kliem et al. | |
| D865,926 S | 11/2019 | Moseley | |
| 10,495,351 B2 | 12/2019 | Kuroda | |
| 10,538,145 B2 | 1/2020 | Shingu | |
| 10,538,302 B2 | 1/2020 | Reese et al. | |
| 10,589,593 B2 | 3/2020 | Westendarp | |
| 10,603,977 B2 | 3/2020 | Richter et al. | |
| 10,625,568 B2 | 4/2020 | Gibble | |
| D884,870 S | 5/2020 | Bergin | |
| 10,654,334 B2 | 5/2020 | Hensler et al. | |
| 10,675,941 B2 | 6/2020 | Williamson | |
| 10,675,943 B2 | 6/2020 | Filipkowski | |
| 10,696,129 B2 | 6/2020 | Bergin | |
| 10,723,197 B2 | 7/2020 | Choi | |
| D905,217 S | 12/2020 | Hederstierna | |
| D907,183 S | 1/2021 | Meda | |
| 10,941,955 B2 | 3/2021 | Heral | |
| D915,569 S | 4/2021 | Meda | |
| D917,036 S | 4/2021 | Hederstierna | |
| 11,034,208 B2 | 6/2021 | Williamson | |
| D940,289 S | 1/2022 | Hederstierna | |
| 2006/0052050 A1 | 3/2006 | Malott | |
| 2007/0227693 A1 | 10/2007 | Allen | |
| 2008/0047289 A1 | 2/2008 | Patrick et al. | |
| 2008/0190120 A1 | 8/2008 | Marciano et al. | |
| 2008/0202138 A1 | 8/2008 | Pabisz et al. | |
| 2009/0209193 A1 | 8/2009 | Kloster | |
| 2010/0251739 A1 | 10/2010 | Mabru | |
| 2012/0091729 A1 * | 4/2012 | Nash | F01K 23/065 |
| | | | 290/1 R |
| 2013/0205811 A1 | 8/2013 | Esch | |
| 2014/0223928 A1 | 8/2014 | Esch | |
| 2016/0018137 A1 | 1/2016 | San Cristobal | |
| 2018/0029436 A1 | 2/2018 | Zaeri et al. | |
| 2018/0029685 A1 | 2/2018 | Hörmann et al. | |
| 2019/0047353 A1 | 2/2019 | Williamson | |
| 2019/0047354 A1 | 2/2019 | Williamson | |
| 2019/0128551 A1 | 5/2019 | Heral | |
| 2019/0315197 A1 | 10/2019 | Williamson | |
| 2020/0041185 A1 * | 2/2020 | Jadric | F25B 41/39 |
| 2020/0148028 A1 | 5/2020 | Westendarp | |
| 2020/0198438 A1 | 6/2020 | Liu | |
| 2020/0298655 A1 | 9/2020 | Williamson | |
| 2020/0338951 A1 | 10/2020 | Paci | |
| 2020/0400354 A1 * | 12/2020 | Komiya | F28D 1/05366 |

(56) References Cited

U.S. PATENT DOCUMENTS

| 2021/0061054 | A1 | 3/2021 | Meda |
| 2021/0061058 | A1 | 3/2021 | Meda |
| 2021/0061060 | A1 | 3/2021 | Meda |
| 2021/0207882 | A1 | 7/2021 | Jurek |
| 2021/0239105 | A1 | 8/2021 | Allard |
| 2021/0276396 | A1 | 9/2021 | Jurek |
| 2021/0354526 | A1 | 11/2021 | Williamson |
| 2022/0001718 | A1 | 1/2022 | Jurek |
| 2022/0009306 | A1 | 1/2022 | Jurek |

FOREIGN PATENT DOCUMENTS

| AU | 2007237183 | B2 | 9/2012 |
| AU | 2009233601 | B2 | 9/2012 |
| AU | 2007202766 | B2 | 8/2013 |
| AU | 354553 | S | 3/2014 |
| AU | 2012261549 | B2 | 5/2015 |
| AU | 367405 | S | 3/2016 |
| AU | 201612249 | S | 5/2016 |
| AU | 201613590 | S | 7/2016 |
| AU | 201613591 | S | 7/2016 |
| AU | 201613592 | S | 7/2016 |
| AU | 201613593 | S | 7/2016 |
| AU | 2016101949 | A4 | 12/2016 |
| AU | 2017100215 | A4 | 3/2017 |
| AU | 201712794 | S | 5/2017 |
| AU | 201712798 | S | 5/2017 |
| AU | 2017200186 | A1 | 8/2017 |
| AU | 201810968 | S | 3/2018 |
| AU | 201810969 | S | 3/2018 |
| AU | 201810970 | S | 3/2018 |
| AU | 201810971 | S | 3/2018 |
| AU | 201810972 | S | 3/2018 |
| AU | 201810973 | S | 3/2018 |
| AU | 201810975 | S | 3/2018 |
| AU | 201810977 | S | 3/2018 |
| AU | 201810978 | S | 3/2018 |
| AU | 201816419 | S | 1/2019 |
| AU | 201910037 | | 2/2019 |
| AU | 201910038 | | 2/2019 |
| AU | 201911094 | | 4/2019 |
| AU | 201912125 | | 6/2019 |
| AU | 2017364256 | A1 | 6/2019 |
| AU | 2019202512 | A1 | 10/2019 |
| AU | 201915241 | | 12/2019 |
| AU | 201916406 | | 12/2019 |
| AU | 201916408 | | 12/2019 |
| AU | 201916409 | | 12/2019 |
| AU | 2018366469 | A1 | 5/2020 |
| AU | 202016120 | | 1/2021 |
| AU | 202016121 | | 1/2021 |
| AU | 202016122 | | 1/2021 |
| AU | 202016123 | | 1/2021 |
| CA | 2518348 | A1 | 3/2006 |
| CA | 2578651 | A1 | 8/2007 |
| CA | 2587994 | A1 | 12/2007 |
| CA | 2611822 | A1 | 5/2008 |
| CA | 2686403 | A1 | 5/2010 |
| CA | 2906348 | A1 | 9/2014 |
| CA | 2951956 | A1 | 12/2015 |
| CA | 2954152 | A1 | 1/2016 |
| CA | 165232 | S | 5/2016 |
| CA | 165233 | S | 5/2016 |
| CA | 167431 | S | 2/2017 |
| CA | 172872 | S | 2/2017 |
| CA | 172873 | S | 2/2017 |
| CA | 172874 | S | 2/2017 |
| CN | 103237671 | A | 8/2013 |
| CN | 103687735 | A | 3/2014 |
| CN | 106470856 | A | 3/2017 |
| CN | 304097003 | S | 4/2017 |
| CN | 106976376 | A | 7/2017 |
| CN | 109070688 | A | 12/2018 |
| CN | 305029216 | S | 2/2019 |
| CN | 305029217 | S | 2/2019 |
| CN | 305029218 | S | 2/2019 |
| CN | 305105066 | S | 4/2019 |
| CN | 110293813 | A | 10/2019 |
| CN | 110385958 | A | 10/2019 |
| CN | 305397384 | S | 10/2019 |
| CN | 111344168 | A | 6/2020 |
| CN | 306848691 | | 2/2021 |
| CN | 213237518 | U | 5/2021 |
| CN | 213237945 | | 5/2021 |
| CN | 306672354 | S | 7/2021 |
| CN | 306681352 | S | 7/2021 |
| CN | 306901266 | S | 10/2021 |
| DE | 19654261 | A1 | 6/1998 |
| DE | 69503723 | | 9/1998 |
| DE | 19730136 | A1 | 1/1999 |
| DE | 69817899 | | 10/2003 |
| DE | 10255833 | A1 | 6/2004 |
| DE | 10336767 | B3 | 12/2004 |
| DE | 59812376 | | 1/2005 |
| DE | 202004007924 | U1 | 10/2005 |
| DE | 202005013530 | U1 | 12/2005 |
| DE | 202004017266 | U1 | 3/2006 |
| DE | 202005000560 | U1 | 5/2006 |
| DE | 102005030362 | B3 | 11/2006 |
| DE | 602004004480 | | 3/2007 |
| DE | 202006001377 | U1 | 5/2007 |
| DE | 202006001374 | U1 | 6/2007 |
| DE | 202006001376 | U1 | 6/2007 |
| DE | 202006009803 | U1 | 11/2007 |
| DE | 202007006292 | U1 | 9/2008 |
| DE | 102007038716 | A1 | 2/2009 |
| DE | 602005012194 | | 2/2009 |
| DE | 202008003123 | | 7/2009 |
| DE | 102008028066 | A1 | 12/2009 |
| DE | 602007009584 | | 11/2010 |
| DE | 502007006725 | | 4/2011 |
| DE | 202011101256 | U1 | 11/2011 |
| DE | 202010012578 | U1 | 12/2011 |
| DE | 202011002986 | U1 | 6/2014 |
| DE | 202013004158 | U1 | 8/2014 |
| DE | 102016220768 | A1 | 4/2018 |
| DE | 112017000915 | T5 | 10/2018 |
| DE | 102017214941 | A1 | 2/2019 |
| DE | 102017207797 | B4 | 8/2019 |
| DE | 112017005541 | T5 | 8/2019 |
| DE | 102018204532 | A1 | 9/2019 |
| DE | 102018206490 | A1 | 10/2019 |
| DE | 102019205194 | A1 | 10/2019 |
| DE | 102017219353 | B4 | 11/2019 |
| DE | 102018206854 | A1 | 11/2019 |
| DE | 202015009786 | U1 | 2/2020 |
| DE | 212018000248 | U1 | 2/2020 |
| DE | 212018000249 | U1 | 2/2020 |
| DE | 112018003284 | T5 | 3/2020 |
| DE | 112018003288 | T5 | 4/2020 |
| DE | 102018222877 | A1 | 6/2020 |
| DE | 112018005002 | T5 | 7/2020 |
| DE | 112018005883 | T5 | 7/2020 |
| DE | 102020203424 | B3 | 7/2021 |
| DE | 112020000265 | T5 | 9/2021 |
| DE | 102020206181 | A1 | 11/2021 |
| DE | 102020206182 | A1 | 11/2021 |
| DE | 102020206183 | A1 | 11/2021 |
| EP | 0700801 | A1 | 3/1996 |
| EP | 0869018 | A2 | 10/1998 |
| EP | 0892225 | A2 | 1/1999 |
| EP | 1538009 | A1 | 6/2005 |
| EP | 1634740 | A1 | 3/2006 |
| EP | 1721765 | A1 | 11/2006 |
| EP | 1752717 | A1 | 2/2007 |
| EP | 1826041 | A1 | 8/2007 |
| EP | 1870270 | A1 | 12/2007 |
| EP | 1925889 | A2 | 5/2008 |
| EP | 1955946 | A2 | 8/2008 |
| EP | 1988612 | A2 | 11/2008 |
| EP | 2189312 | A1 | 5/2010 |
| EP | 2192040 | A1 | 6/2010 |
| EP | 2196390 | A1 | 6/2010 |
| EP | 2433658 | A1 | 3/2012 |

(56) References Cited

FOREIGN PATENT DOCUMENTS

| EP | 2665611 | B1 | 10/2014 |
| EP | 2178710 | B1 | 11/2015 |
| EP | 2616258 | B1 | 2/2016 |
| EP | 3113965 | A1 | 1/2017 |
| EP | 3241695 | A3 | 4/2018 |
| EP | 2714440 | B1 | 5/2018 |
| EP | 2994326 | B1 | 7/2018 |
| EP | 3401619 | A1 | 11/2018 |
| EP | 3411250 | A1 | 12/2018 |
| EP | 3476630 | A1 | 5/2019 |
| EP | 3543047 | A1 | 9/2019 |
| EP | 3564564 | A1 | 11/2019 |
| EP | 3674115 | A1 | 7/2020 |
| EP | 3592585 | B8 | 7/2021 |
| IT | 1406439 | B1 | 2/2014 |
| RU | 2753994 | C2 | 8/2021 |
| WO | 2009021994 | A1 | 2/2009 |
| WO | 2009139201 | A1 | 11/2009 |
| WO | 2010104960 | A1 | 9/2010 |
| WO | 2012001630 | A1 | 1/2012 |
| WO | 2012034695 | A1 | 3/2012 |
| WO | 2012113538 | A1 | 8/2012 |
| WO | 2012159749 | A1 | 11/2012 |
| WO | 2014143181 | A1 | 9/2014 |
| WO | 2014180559 | A1 | 11/2014 |
| WO | 2015191912 | A1 | 12/2015 |
| WO | 2017143393 | A1 | 8/2017 |
| WO | 2017143394 | A1 | 8/2017 |
| WO | 2018096127 | A1 | 5/2018 |
| WO | 2019019355 | A1 | 1/2019 |
| WO | 2019038023 | A1 | 2/2019 |
| WO | 2019082168 | A1 | 5/2019 |
| WO | 2019097448 | A1 | 5/2019 |
| WO | 2019193316 | A1 | 10/2019 |
| WO | 2019207451 | A2 | 10/2019 |
| WO | 2019229706 | A1 | 12/2019 |
| WO | 2019244011 | A1 | 12/2019 |
| WO | 2020143636 | A1 | 7/2020 |
| WO | 2020151541 | A1 | 7/2020 |
| WO | 2020188485 | A2 | 9/2020 |
| WO | 2020192746 | A1 | 10/2020 |
| WO | 2021074841 | A1 | 4/2021 |
| WO | 2021186414 | A1 | 9/2021 |
| WO | 2021228601 | A1 | 11/2021 |
| WO | 2021228605 | A1 | 11/2021 |
| WO | 2021228620 | A1 | 11/2021 |

OTHER PUBLICATIONS

Self-Contained 17000 BTU 115V 50/60HZ Marine Air Conditioner Copper Fin (Heating and Cooling) by Mabru, Available Online at: https://mabrustore.com/collections/marine-air-conditioning/products/mabru-sc-17000-btu115v-50-60hz-marine-air-conditioner-copper-fin-heating-and-cooling, Review date Aug. 10, 2021.

Dometic Turbo DTG, Manual Download: https://www.dometic.com/en-us/professional/marine-solutions/air-conditioning/dometic-turbo-dtg-264947, 2022.

Restriction Requirement issued in U.S. Appl. No. 29/767,929 mailed on Dec. 29, 2023.

European Union Design Application No. 008623631-0001-002 titled "Air Conditioning Housing" filed on Jul. 20, 2021.

United Kingdom Application No. 6149430 titled "Air Conditioning Housing" filed on Jul. 19, 2021.

United Kingdom Application No. 6149431 titled "Air Conditioning Housing" filed on Jul. 19, 2021.

Notification of Registration Issued in European Union Design Application No. 008623631-0001-002 mailed on Jul. 20, 2021.

PCT Application No. PCT/IB2022/050651 titled "Air Conditioning System for a Vehicle" filed on Jan. 25, 2022.

U.S. Appl. No. 29/767,929 "Air Conditioning Housing" filed Jan. 26, 2021.

U.S. Appl. No. 63/141,800 "Air Conditioning Housing" filed Jan. 26, 2021.

Registration Certificate for United Kingdom Application No. 6149430 mailed on Jul. 19, 2021.

Registration Certificate for United Kingdom Application No. 6149431 mailed on Jul. 19, 2021.

Invitation to Pay Additional Fees for PCT Application No. PCT/IB2022/050651 mailed on May 2, 2022.

International Search Report and Written Opinon for PCT Application No. PCT/IB2022/050651 mailed on Jul. 1, 2022.

Design U.S. Appl. No. 29/715,592, filed Dec. 3, 2019 titled Filter Housing.

Design U.S. Appl. No. 29/758,314, filed Nov. 13, 2020 titled Air Conditioning Apparatus.

Dometic Product Catalog—Climate Control. 2015.

Dometic Product Catalog—Climate Control. 2016.

10-Minute Tech, Trailer Life, Jul. 1996, pp. 69-70 dated Jul. 1, 1996.

American RV Company, Dometic 459530 Duo Therm 13,500 BTU Brisk Air Conditioner High Efficiency Upper Unit Trailer Camper RV, Mar. 23, 2014, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.

American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.

American RV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.

American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.

Dirna Bergstrom: Slim Cool; http://www.dirna.com/files/dirna-manuals/220RE00183.pdf May 21, 2014.

Dometic Corporation, Dometic High Performance Air Conditioners, 2 pages, Jan. 1, 2011.

Dometic Duo-Therm, p. 140, Feb. 23, 2013.

Dometic Group: "Climate Control", http://www.dometic.com/enus/Americas/USA/RV-Products/climate, 2 pages.

Dometic Waeco Coolair RT 880; http://vwww.dometic.co.uk/product/waeco-coolair-rt-880-2/ May 14, 2015.

Eberspacher Cooltronic Parking Coolers with High Efficiency with the Engine OFF; http://www.eberspacher.com/products/air-conditioning/cooltronic-truck-parking-coolers.html Jun. 23, 2015.

Indelb; WO Oblo; Sleeping Well Oblo; http://www.indelb.com/products/parking_air_cooler/sleeping_well/sw_oblo Apr. 1, 2016.

Webasto: Rooftop air conditioning systems: Rooftop 3.5-9.9 kw; https://web.archive.org/web/20161201014045/https://www.webasto.com/au/markets-products/off-highway/air-conditioning/rooftop-air-conditioning/rooftop-ac-35-99-kw/.

Webasto; Truck parking cooler: Cool Top Vario 10 E; http://www.webasto.com/GB/marketsproducts/truck/air-conditioning/products/cool-top-vario/ Apr. 25, 2016.

Youtube; Viesa Kompressor; https://www.youtube.com/watch?v=SPK17XEvVLO May 22, 2012 (https://www.google.com/?gws_rd=ssl#q=https://www.youtube.com/watch?v%3DSPK17XEvVL0&spf=1495819902591).

(56)        References Cited

OTHER PUBLICATIONS

Dirna Bergstrom: Parking Coolers—No-Idle Electrical A/C—
MiniCool Compact 1.4; http://www.dirna.com/parking-coolers-no-
idle-electrical-ac-compact/ Mar. 17, 2015.
Design U.S. Appl. No. 29/760,605, filed Dec. 2, 2020.
Design U.S. Appl. No. 29/767,929, filed Jan. 26, 2021 titled Air
Conditioner Housing.
Design U.S. Appl. No. 29/774,535, filed Mar. 17, 2021 titled Air
Distribution Box.
U.S. Appl. No. 63/175,304, filed Apr. 1, 2021.
U.S. Appl. No. 62/819,711, filed Mar. 18, 2019 titled Mobile Air
Conditioner.
U.S. Appl. No. 17/579,442, filed Jan. 19, 2022 titled "Heating
Arrangement and Heat Distribution Unit for Such a Heating Arrange-
ment".
U.S. Appl. No. 17/673,080, filed Feb. 16, 2022 titled "Recreational
Vehicle, Cooling Device, Controlling System and Method for
Controlling the Cooling Device".
Design U.S. Appl. No. 29/826,755, filed Feb. 15, 2022 titled
"Housing".
Design U.S. Appl. No. 29/826,757, filed Feb. 15, 2022 titled
"Housing".
U.S. Appl. No. 17/440,104, filed Sep. 16, 2021 titled "Mobile Air
Conditioner".
AU Application No. 2022213822 titled "Air conditioning system
for a vehicle" filed on Jun. 22, 2023.
EP Application No. 22702047.6 titled "Air conditioning system for
a vehicle" filed on Aug. 22, 2023.
International Preliminary Report on Patentability issued in PCT
Application No. PCT/IB2022/050651 mailed on Aug. 10, 2023.
Vector Compact Installation & Operation Manual, Marine Air
Systems (Jul. 18, 2005).
Vector Series Installation, Operation & Maintenance, Marine Air
Systems (Jun. 1998).
V-berth, Self-Contained VBSC 2.3, Lunaire Marine (Year: 1985).

* cited by examiner

AIR CONDITIONING SYSTEM FOR A VEHICLE

CLAIM TO PRIORITY

This 35 U.S.C. § 371 National Stage Patent Application claims priority to and benefit of PCT Patent Application No. PCT/IB2022/050651, filed Jan. 25, 2022, which claims priority to and benefit of U.S. Provisional Patent Application Ser. No. 63/141,800, filed Jan. 26, 2021 and titled "Air Conditioning System for a Vehicle", all of which is incorporated by reference herein.

BACKGROUND

1. Field of the Invention

Present embodiments relate to an air conditioning system for a vehicle. More specifically, but without limitation, present embodiments relate to a vehicle air conditioning system which comprises a variable speed motor and a controller which is capable of auto selecting an input power source as either AC (Alternating Current) for example single phase from 100 VAC to 240 VAC, or DC (Direct Current). A controller is also provided which is capable of controlling two or more motors for an air conditioning system.

2. Description of the Related Art

In the recreational vehicle (RV) industry and the marine industry air conditioning (A/C) efficiency is limited. Beyond that, there are additional issues. First, load shedding is a problem today. Current A/C's have high current demand to start so they are often staggered because of a limit on input power. That limit can be due to a limit on camp ground power, generator power, or inverter power.

Second, today's air conditioners are of limited intelligence, i.e. not typically smart devices. The devices may not monitor the amount of power they have available and they also have limits to what they can adjust. Most air conditioners merely provide a low, medium, or high setting for the fan speed, which is a small portion of the power used.

Still further, many OEM's are either making electric vehicles or have plans. Power management becomes more important and likewise, requires the ability to connect to the battery packs of such vehicles.

Finally, current air conditioners were not designed to work with power input from solar panels. With the desire to better control power input, there is also a desire to improve the number of power sources from which the air conditioner may be operated.

It would be desirable to overcome these and other problems in order to provide an air conditioner which may be driven by a plurality of power sources, may be connected to various power inputs, and which may better monitor and control power usage in order to improve efficiency.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

According to some embodiments, an air conditioning device for a vehicle includes a main body, a blower including an inlet and an outlet, the inlet being in air communication with the main body, the blower further including blades rotating therein, a compressor located on the main body, a variable speed motor operably connected to the compressor, the variable speed motor driving rotation of the compressor, a refrigerant conduit in fluid communication with the compressor, an evaporator in fluid communication with the compressor and in air communication with the blower, at least one additional motor, a controller having a dual voltage input for alternating current (AC) and direct current (DC), the controller operating the variable speed motor and the at least one additional motor.

According to some embodiments, the following optional features may be used alone with the air conditioning device or may be used in combination with other options and the air conditioning device. The controller may further comprise auto selection between line AC voltage and DC voltage that is supplied. The line voltage being 100V AC-240V AC and in 50 or 60 HZ. In some embodiments, when both AC voltage input and DC voltage input are available, the controller may default selection to AC voltage. The air conditioning device may further comprise an inverter in electrical communication with the variable speed motor, the inverter capable of two mounting locations: remote mounted from the compressor or mounted to a chassis. The air conditioning device may further comprise a tether to remote mount the inverter spaced from the compressor. The controller may be located proximate to the compressor on the main body. The DC voltage being from any one of 12V DC, 24V DC, 48V DC, or 350-380V DC. The DC voltage input being between about 350-380V DC directly connected to the DC voltage input. The air conditioning device may further comprise an expansion valve to regulate refrigerant flow. The air conditioning device may further comprise a reversing valve to reverse refrigerant flow and provide heat. The air conditioning device may further comprise a condenser heat exchanger having a heat exchange function with a refrigerant. The condenser heat exchanger may be an open water heat exchanger. The condenser heat exchanger may have at least some titanium components. The condenser heat exchanger may be an open air heat exchanger. The condenser heat exchanger may be disposed in the main body. The air conditioning device may further comprise a drain pan defines a portion of the main body. The air conditioning device may further comprise a condensate sensor in the drain pan. The main body may further comprise one or more covers on the drain pan. The vehicle may be a nautical vehicle or a recreational vehicle.

According to some other embodiments, an air conditioning device for a vehicle may comprise a main body, a blower including an inlet and an outlet, the inlet being in air communication with the main body, a compressor located on the main body, a variable speed motor operably connected to the compressor, the variable speed motor driving rotation of the compressor, a refrigerant conduit in fluid communication with the compressor, an evaporator in fluid communication with the compressor and in air communication with the blower, a dual voltage input for alternating current (AC) and direct current (DC), an auto-tuning function which selects output power based on available input power.

According to still a further embodiment, an air conditioning device comprises an air conditioner having a compressor, an evaporator, and at least one heat exchanger associated with ambient air or open water heat exchange, an input bus from one or more modules which provides a configuration message or a dynamic message, a driver associated with each of an inverter compressor motor of the compressor, a first brushless DC motor of the evaporator, and a second brushless DC motor of the at least one heat exchanger, a controller that controls the compressor, the evaporator and the at least one heat exchanger, wherein the controller derates power output based on an amount of available power and input from the input bus.

According to some embodiments, the following options may be used alone with the air conditioning device or in combination with other options and the air conditioning device. Each driver provides speed control for respective of the first and second DC brushless motors. The controller may provide multi-motor coordination. The multi-motor coordination improves efficiency.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of an air conditioning system will now be described by way of examples. These embodiments are not to limit the scope of the claims as other embodiments of an air conditioning system will become apparent to one having ordinary skill in the art upon reading the instant description. Non-limiting examples of the present embodiments are shown in figures wherein:

DETAILED DESCRIPTION

Figure 1:
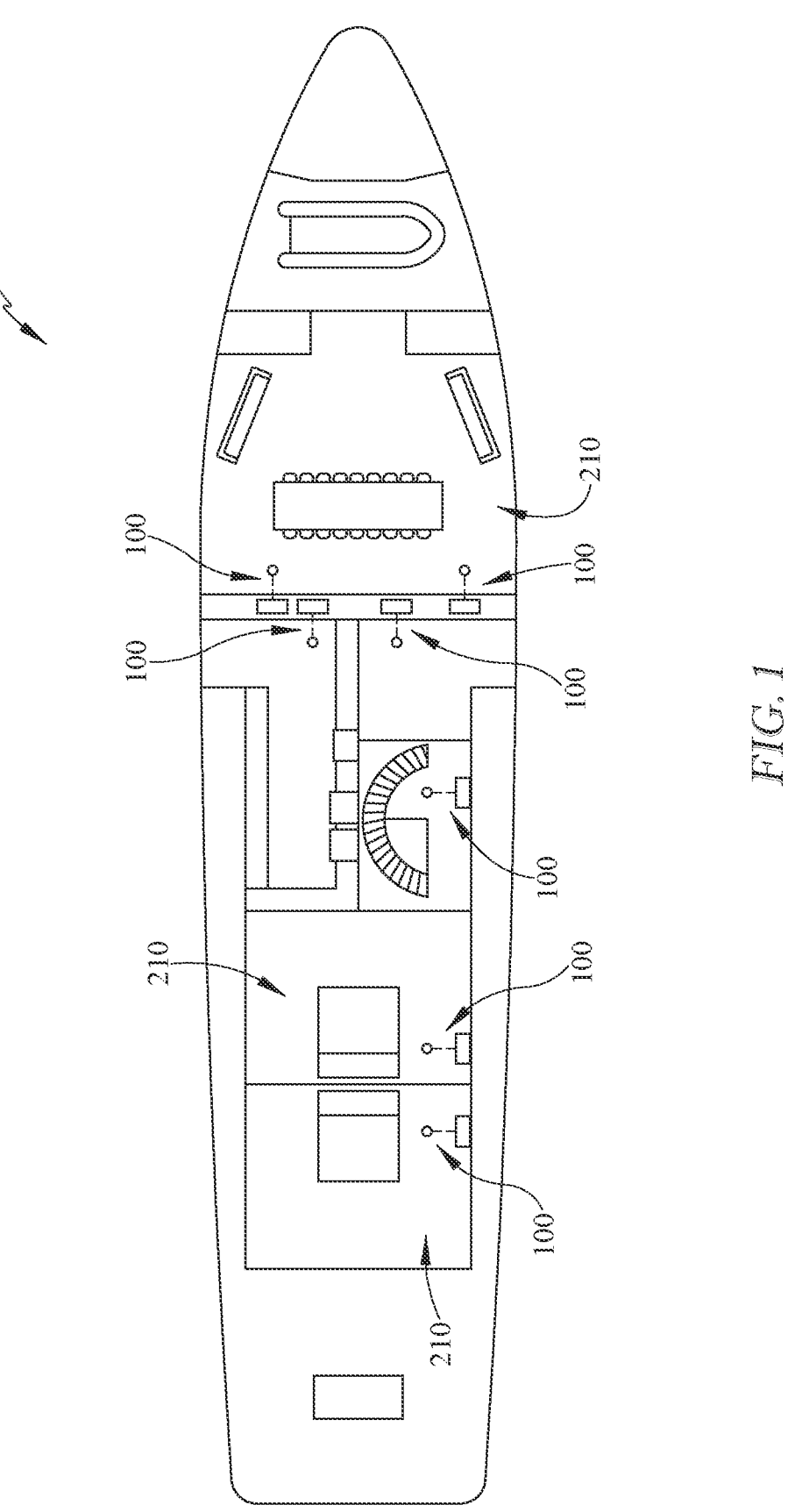
FIG. 1 is a top schematic view of a marine craft or vehicle.

It is to be understood that an air conditioning system is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

The terms "air conditioner" or "air conditioning" (A/C), will be used to encompass any treatment of air including heating and cooling and may include heat pumps but also other HVAC systems. Air conditioning is also meant to encompass both indoor air conditioning, which is limited to the air conditioning of an enclosed area and outdoor air conditioning, which occurs in the open air. Moreover, some of the present embodiments are designed for use in a nautical vehicle, but alterations are within the scope of the present invention and will have use in other applications such as conventional vehicles, recreational vehicles, aircrafts or other means of transportation and also in means of habitation.

Referring now to FIGS. 1-7, various embodiments of an air conditioning system are provided which provide more efficient operation of a compressor motor, and which comprises improved control of motors associated with the air conditioning system. The air conditioning system may be used with a vehicle, which may include without limitation, a recreations vehicle, marine craft or other vehicles. Additionally, the air conditioning system may also be used for fixed structures, for example to cool buildings such as server farms, battery farms, and other fixed structures wherein cooling is desirable and may comprise both AC and DC power sources. The air conditioning system utilizes an inverter which is remotely mountable, and which automatically selects a voltage source based on the input voltage provided and may additionally auto-tune based on the input voltage provided and/or available power. The available power may be information that is sent over a data bus and/or information written inside a configuration file.

Referring now to FIG. 1, an example vehicle is provided which is embodied as a marine craft 200. The marine craft 200 may include one or more air conditioning systems 100. The air conditioning systems 100 may provide cooling for various rooms, groups of rooms, or zones 210 of the marine craft 200. For example, the marine craft 200 may have a salon, a master state room, a crew cabin, and a utility room having one or more engines, and various equipment which provide functional operation on the marine craft 200. Each of these rooms 210 may comprise one or more air conditioning systems 100, or some combination of rooms may comprise one or more air conditioning systems 100 to cool the area. It should be understood that each zone may correspond to each room, or each zone may correspond to a portion of a room, or multiple rooms.

With various air conditioning systems 100 on the marine craft 200, one skilled in the art will recognize that it may be desirable to operate some of the air conditioning systems 100 at higher levels than others depending on the time or depending on various factors. For example, at night, it may be desirable to operate the air conditioning system 100 of the master state room at a higher level, while reducing the operation level in other areas of the boat, since users may be asleep and cooling of other zones may not be needed.

In the instance of a marine craft 200, the air conditioning system 100 may be located in each room or zone 210 needing cooling. In some embodiments, the air conditioning system 100 may be self-contained, in a single housing. Further, the air conditioning system 100 may include cooling mechanicals 110 (FIG. 3) and in the marine embodiment may include an air or open-water cooled condenser for heat exchange of the refrigerant. In some embodiments, for example, the pumping system for the open water may be remotely located from the remainder of the mechanicals and the open water routed by conduit to the air conditioning system 100. The term open water refers to large open bodies of water such as lakes, rivers, seas, oceans, or the like. This may still be considered a self-contained system. Or, in other embodiments, one or more components, or cooling mechanicals, of any one air conditioning system 100 may be located at differing locations. The condenser may be a single heat exchanger in communication with each air conditioning system 100, or may be an individual condenser for each air conditioning system 100, or some combination.

Figure 2:
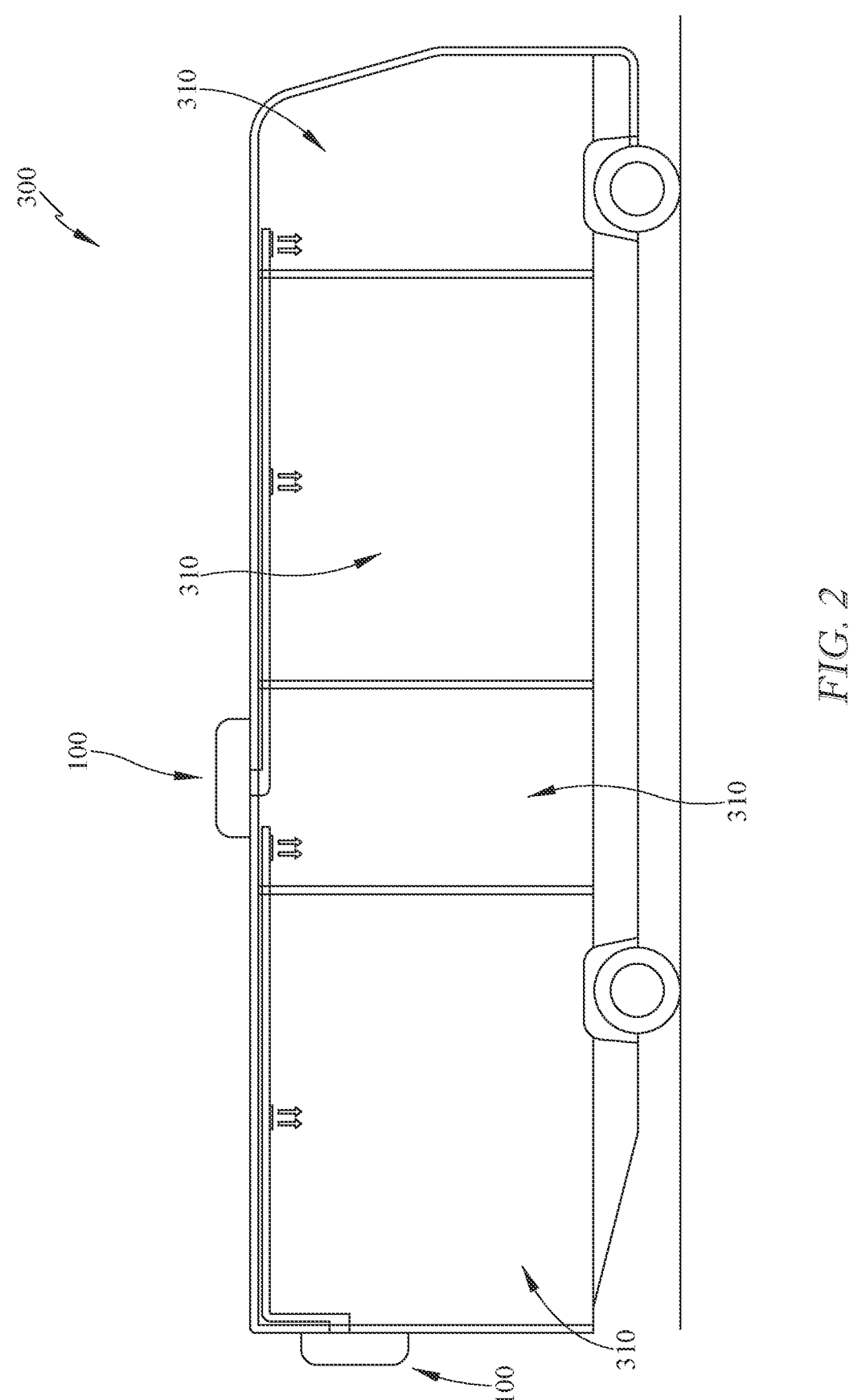
FIG. 2 is a side schematic view of a recreational vehicle (RV)

Further, while the first figure depicts a marine craft 200, the vehicle may alternately comprise a recreational vehicle 300 (FIG. 2), for example a towable or coach, which has multiple rooms or zones 310 which are each cooled by different air conditioning systems 100, as shown in FIG. 2. The zones 310 may, for non-limiting example, correspond to the den area, kitchen area, or a bedroom, for example. As previously indicated however, each zone may also correspond to a portion of a room or multiple rooms.

Referring now to FIG. 2, a second example vehicle is shown in the form of the recreational vehicle 300. The recreational vehicle 300 also has a plurality of zones 310 which are each cooled by one or more air conditioning systems 100. The air conditioning system 100 may be mounted on a wall or on the vehicle roof. Further, there may be times when the den area needs to increase cooling capacity, for example due to entry and exit in this area. Alternatively, the bedroom may require additional cooling at night, when other areas of the RV do not require the same amount of cooling during the sleeping hours.

As compared to the marine craft 200, in the instance of a recreational vehicle 300, the cooling mechanicals 110 (FIG. 3) may include an air-cooled condenser for heat exchange to atmosphere. The condenser may be included in the air conditioning system in the RV embodiment as opposed to a remote condensing heat exchanger on the marine system.

In either embodiment, each air conditioning system 100 of the plurality of air conditioning systems comprises a plurality of cooling mechanicals 110. Each air conditioning system 100 is described as a refrigerant compression type air conditioning system.

Figure 3:
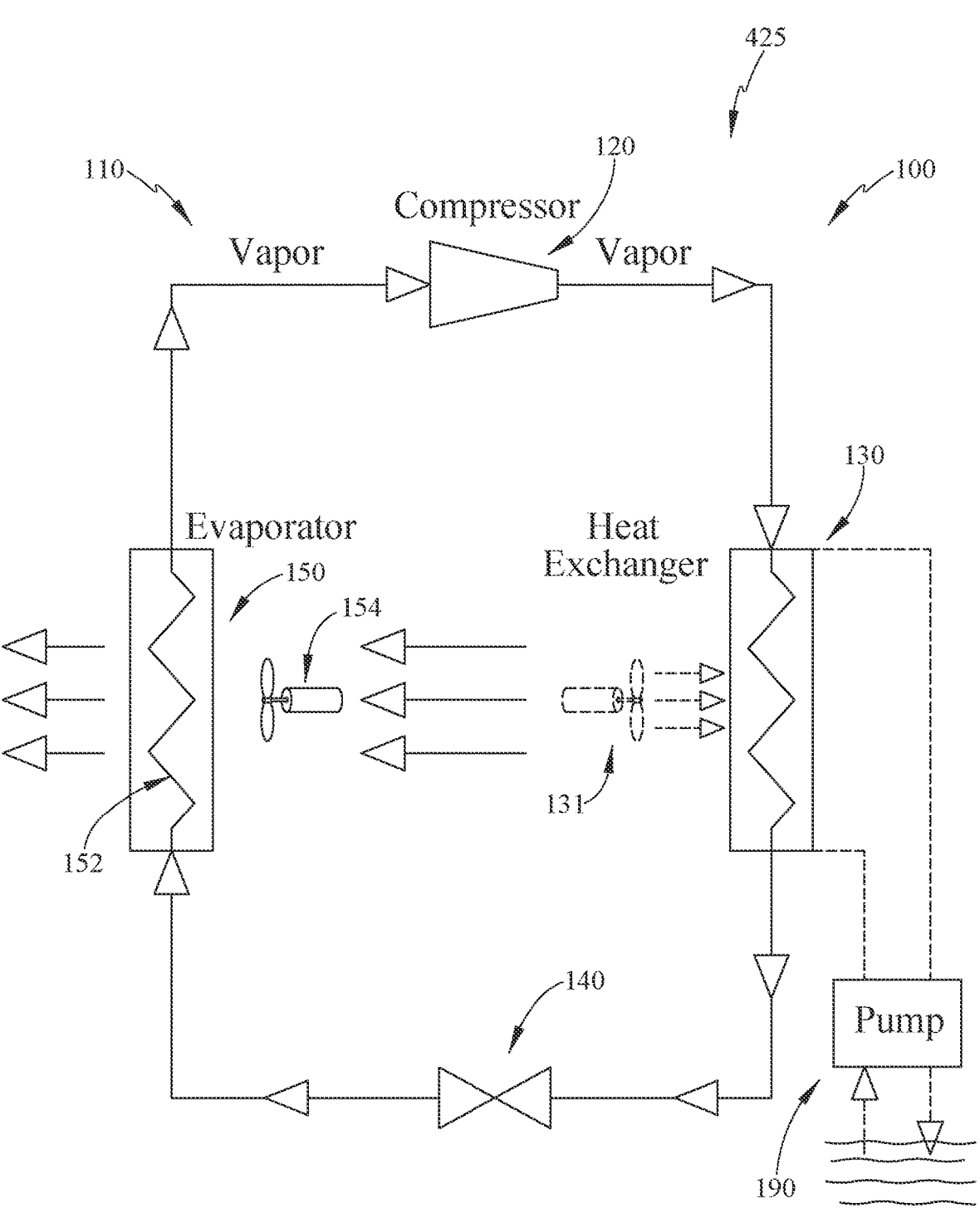
FIG. 3 is a schematic view of a plurality of cooling mechanicals defining an air conditioner.

Referring now to FIG. 3, a schematic view 425 of a plurality of cooling mechanicals 110 used with an example air conditioning system 100. The term cooling mechanicals refers to the components that perform the conditioning of air, such as without limitation, a compressor, heat exchanger condenser, evaporator, and/or expansion device. Other components and devices may be utilized, and for example may include reversing valves for heat pump functionality. The air conditioning system 100 is shown in schematic view for ease of discussion. As depicted, the compressor 120 compresses a refrigerant, which passes from the compressor 120 through the air conditioning system 100. The compressor 120 comprises a motor, which may be a part of the compressor structure or may be a separate component that connects to the compressor 120. The motor is not shown but is generally represented and discussed as a portion of the compressor 120 throughout the specification. In the circuit, the compressed refrigerant next passes through a heat exchanger 130, such as a condenser which cools the vapor form refrigerant some amount. The heat exchanger 130 which may be in the form of a condenser utilizing air cooling heat exchange with atmosphere, or in other embodiments may be a water cooled condenser which exchanges heat with open water, such as a lake, river, sea, ocean, or the like. Further for example, in marine use, the condenser may be located within the air conditioning system 100 or may be remotely located wherein the refrigeration conduit lines may extend to the cabin or other location where the remainder of the air conditioning system 100 is located. The heat exchanger 130, when in the condenser form may include an optional fan having a fan motor 131 (both shown in broken line) to remove heat from the vapor passing through the coil. Alternatively, when in the form of a water cooled condenser, the heat exchanger 130 may provide a coil-in-coil heat exchange design in fluid connection with a pump for open water and with fluid connection to a refrigerant line. The water cooled condenser may optionally include a titanium, or titanium alloy, portion of the coil to withstand use of open water such as rivers, lakes and salt water any of which may comprise abrasives.

Next, the refrigerant reaches a capillary tube 140, or in other embodiments an expansion valve, which reduces pressure of the partially cooled refrigerant, further cooling the refrigerant before the refrigerant passes through an evaporator 150. The capillary tube, or expansion valve, 140 may meter the refrigerant moving from the heat exchanger 130 to the evaporator 150.

The evaporator 150 may have one or more coils which extend in air flow communication with air flow directed to the room or zone so as to cool the area. It should be understood that the evaporator coils 152 may be in the room or zone, or the evaporator coils 152 may be remote from the room or zone wherein a duct servicing the room or zone delivers the conditioned air to the room or zone. After passing through the evaporator 150, the refrigerant returns to the compressor 120 for the compression to pass through the cycle again. The cycle is merely one example and other components and variations are possible.

The refrigerant may be of various types. For example, some refrigerants which may be utilized include hydrofluorocarbons (HFCs), such as R-410A, HCFCs such as R-22, HFCs R-134a, R600a, R1234yf, and/or R1234e. Still further, newer refrigerants may include supercritical carbon dioxide, known as R-744, R-470a and R466a. These have similar efficiencies compared to existing CFC and HFC based compounds and have lower global warming potential. These are merely examples however as other refrigerants may be used.

The schematic view 425 is a simple compression cycle and other features and functions may be utilized. For example, additional conduit lines of further complexity may be utilized to provide the desired cooling. As previously mentioned, a reversing valve may be added to provide heat pump function. The schematic view, therefore, is merely exemplary for depicting the general refrigerant compression cooling cycle and should not be considered limiting, as other embodiments are possible.

Figure 4:
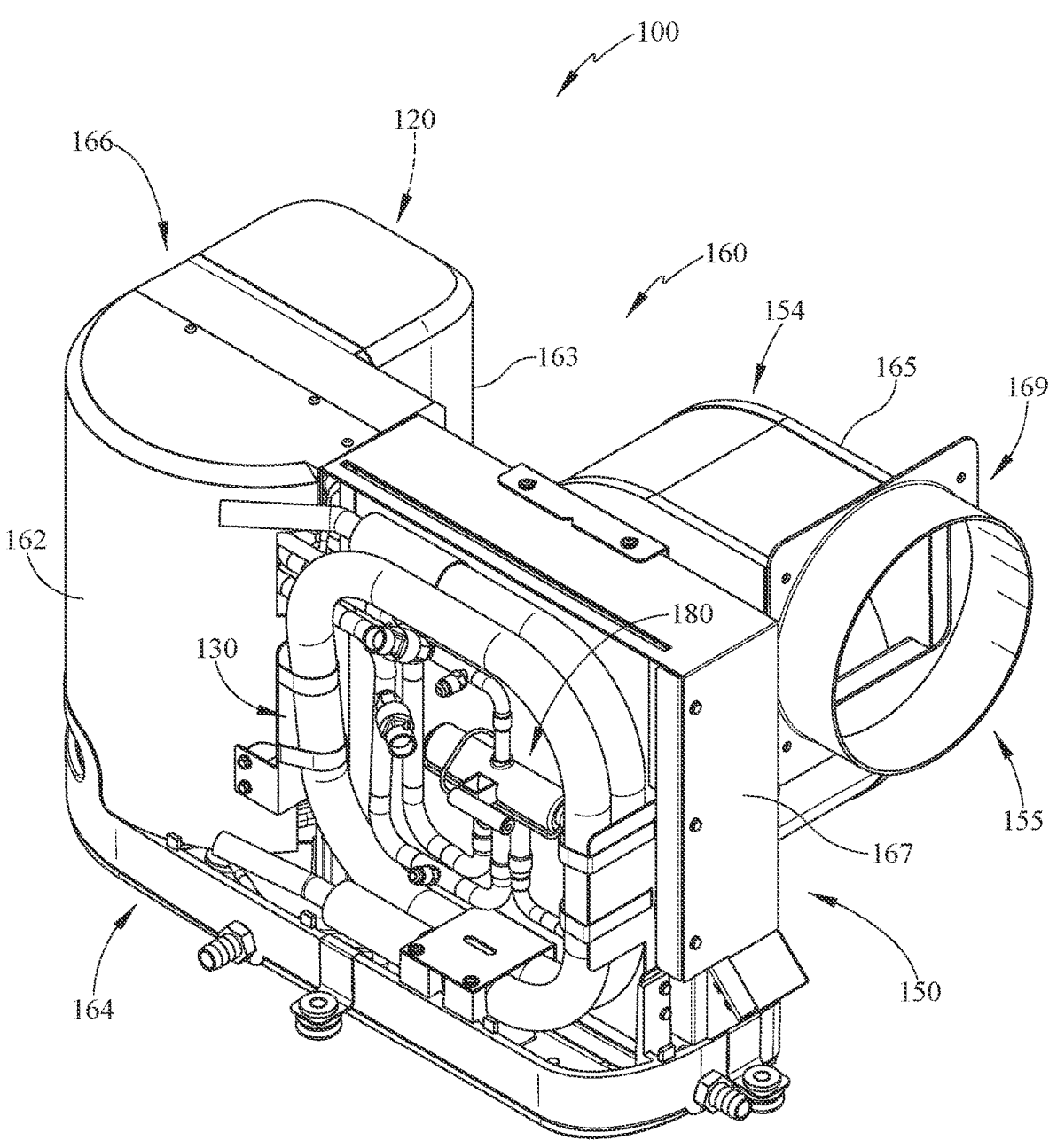
FIG. 4 is a perspective view of the air conditioning system with covers.
Figure 5:
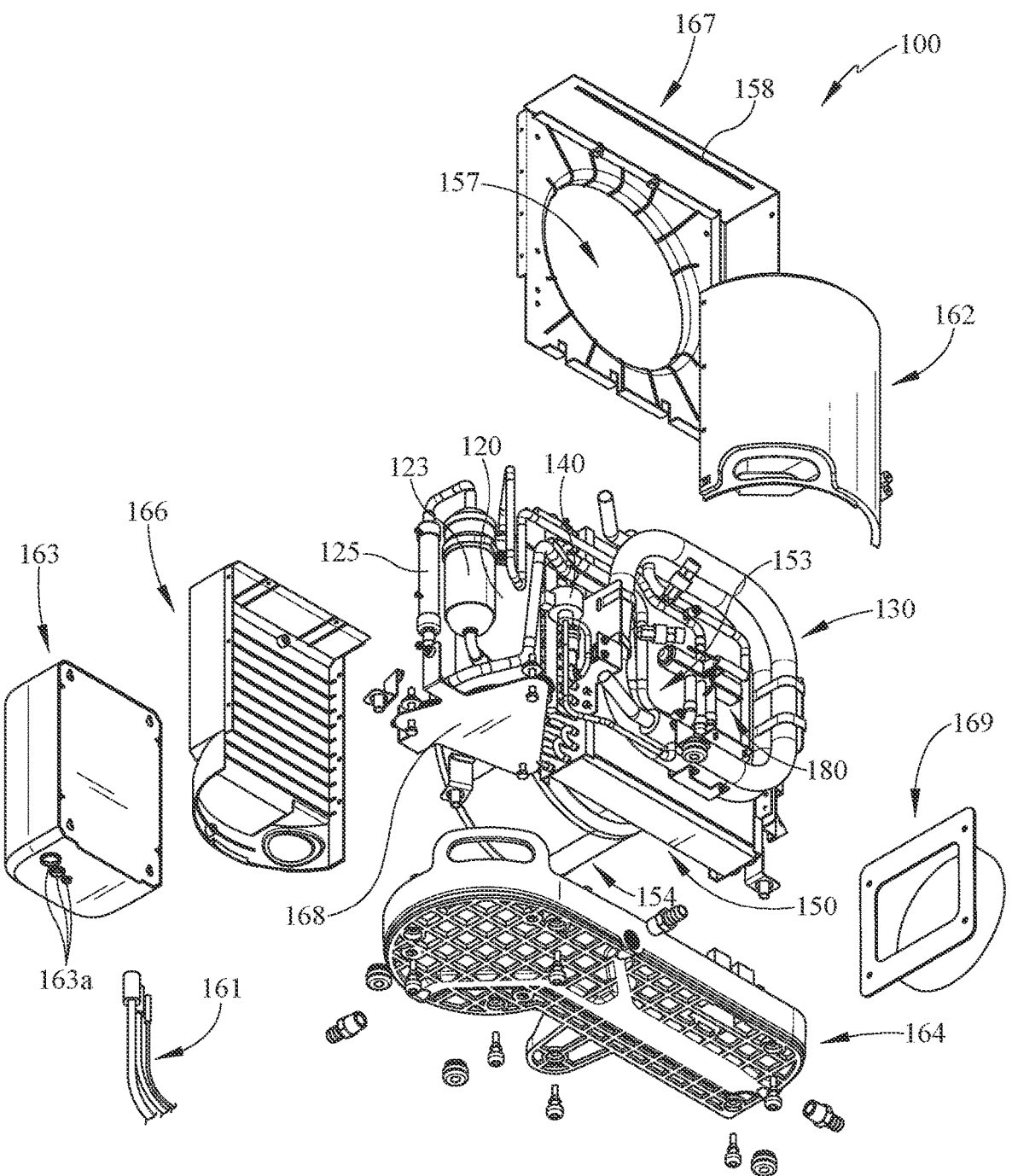
FIG. 5 is a perspective view of the air conditioning system of FIG. 4.

Referring now to FIGS. 4 and 5, an example air conditioning system 100 according to an example is shown in a perspective assembled view and exploded view. In this embodiment, an example marine air conditioner is provided with a body 160 defined by one or more covers or shrouds 162 which enclose some or all of the cooling mechanicals 110 (FIG. 3). The body 160 of the air conditioning system 100 may also comprise a drain pan 164 upon which the various cooling mechanicals may be mounted. The exterior of the air conditioning system 100 also comprises the blower or evaporator fan 154, and may optionally include additional shrouds or covers. The interior of the air conditioning system 100 primarily comprises the compressor 120, a heat exchanger (or condenser) 130, an evaporator 150 and a capillary tube or expansion valve 140 also shown in FIGS. 3 and 5. In the instant embodiment, the compressor 120 may be an inverter compressor so that a corresponding compressor motor may be run at variable speed. The compressor 120 may include a motor integrally or may have a motor that is separate of the compressor structure but which drives the compressor structure. In some embodiments, the compressor 120 may be an inverter compressor and may therefore run at different speeds and may be more efficient than a single speed compressor. For example, when less cooling is needed, the inverter compressor may run at a lower speed, while at higher cooling loads, the compressor 120 may run at higher speeds. When assembled, the compressor 120 motor and compression component may be inside the first shroud or cover 162 and the second shroud or cover 166. A condensate sensor 770 (FIG. 7) may be disposed in the drain pan 164 to detect when condensate reaches a certain level requiring some manual action, or an automated action, such as opening of a discharge valve or a pump.

In some embodiments, the one or more covers or shrouds 162 comprise the first cover or shroud 162, and a second cover or shroud 166. Together the first and second shrouds or covers 162, 166 surround the compressor 120 and some other components and/or conduits for refrigerant, for example.

On an opposite side of the second cover 166 from the first cover or shroud 162 is an electric box 163. The electric box 163 is a housing for a controller 400 (FIG. 6), which controls the operation of the air conditioning system 100. The electric box 163 may be mounted on the main body 160, for example on second cover or shroud 166, or the electrical box 163 may be mounted remote from the air conditioning system 100, with the use of a tether 161 (FIG. 5). The electric box 163 and controller 400 (FIG. 6) therein may be located proximate to the main body 160 if remotely mounted, for example on a bulkhead or other structural member near the air conditioning system 100. The distance between the electric box 163 and the main body 160 may be limited by the tether length. The electric box 163 may be cooled by natural convection or by forced air convection, as shown in FIG. 7, depending on the heat generated and needing to be removed.

Still further an evaporator shroud 167 may be provided which covers some or all of the evaporator 150. The shroud 167 may comprise an air return opening to supply air to the evaporator 150, wherein in some examples the air return opening is in a face of the evaporator. The evaporator shroud 167 comprises a central opening in a sidewall, which is an inlet 157 to the blower or fan 154. The inlet 157 is in fluid communication with air passing over the evaporator so the conditioned air is next blown from the blower or fan 154. The blower 154 may have an additional blower shroud 165 surrounding the remainder of the structure. A blower outlet ring 169 may be provided for connection to duct, which can guide the conditioned air to a desired location for dispersing in the RV 300 or marine craft 200. The outlet ring may be located at the blower outlet 155.

This embodiment shows a self-contained type air conditioning system 100 in which the major components of a refrigeration cycle are present. However, alternative embodiments may leave out some of these major components and still be within the scope of the present invention. For example, it is possible to install the compressor and the condenser at a remote location and to simply have an embodiment in which only the blower 154 and the evaporator 150 are present among the major components of a refrigerating cycle with the dimensions of the drain pan 164 reduced accordingly. In such embodiments, for example, refrigerant lines could extend from the remote mechanicals to the evaporator.

The covers 162, 166, and the electric box 163 of the air conditioning systems 100 are easily removable for access to the components of the air conditioning system 100, and the evaporator shroud 167 encloses at least part of the evaporator 150 while the shrouds 162, 166 enclose the compressor 120 (FIG. 3). The covers or shrouds 162, 166, 167, shown in their removed state in FIG. 5 from pan 164, are molded to suit the shape of the components of the air conditioner and to reduce or minimize the volume of the air conditioning system 100. In this embodiment, the evaporator shroud 167 is substantially rectilinear but it may additionally or alternatively have curved surfaces similar to the supply side cover and the return side cover. The evaporator 150 includes an inlet 153 that is in air communication with a return air supply that channels air to the air conditioning system 100. In this manner, the evaporator shroud 167 can operate as a return air plenum. While the return inlet 153 is defined by the evaporator, other embodiments may be provided wherein the inlet is located in alternate locations, or in additional locations. A slot 158 may be provided in the evaporator shroud 167 wherein a filter may be positioned when the shroud 167 is positioned on the evaporator 150 so that air passing through the evaporator is filtered before passing out of the blower 154.

The molded shape of the shrouds 162, 166 may have curvature, or rectilinear or other shapes or geometries. The shrouds may also vary in size. The instant embodiments may be configured to correspond to the shape of the pan 164 which is generally rectangular with a bulging end to receive the compressor 120 and some additional components of the refrigeration system. Various shapes may be used as needed to fit the cooling mechanicals on the pan 164. In particular, bulging portion of the shrouds 162, 166 allow clearance for an accumulator 123 of the compressor 120 whose location with respect to the compressor 120 can change depending on the type or brand of compressor 120 used. Additionally, the bulging area provides a vibration isolator 125. Thus, the bulging area of the drain pan 164 and the corresponding curvature of the shrouds 162, 166 allow for various mechanicals to be positioned in this area of the air conditioning system 100. Further however, this embodiment may be for a marine craft 200 and therefore other shapes may be utilized if the shape of the body 160 changes.

The shroud structures 162, 166, 167 may include noise-reducing means to reduce noise emanating from the air conditioning components such as the compressor 16. In this embodiment, the shrouds 162, 166, 167 may include such noise-reducing means. The noise-reducing means can comprise a particular type of paint, foam, padding or the like applied on the interior or exterior, or both, of the shrouds.

The shapes or number of covers in this embodiment should not be deemed as limitations, and variations in the covers are also encompassed by the present embodiments. For example, it may be possible to have one integral cover instead of the plurality used in this embodiment and the covers could be various shapes and sizes depending on the layout, and number, of the cooling mechanicals 110 on the pan 164.

In the depicted embodiment, two motors are utilized. One motor for the compressor 120 and one motor for the evaporator fan or blower 154. As previously described, in an RV embodiment or any embodiment exchanging heat with atmosphere at the condenser, the air conditioning system 100 may have a third motor for a condenser fan wherein the condenser fan is used for heat exchange to atmosphere.

Referring now to FIG. 5, an exploded perspective view of the air conditioner is shown with the covers exploded for improved view of the example cooling mechanicals 110. The body 160 includes the pan 164 upon which the mechanicals are provided. The compressor 120 is shown on a mounting plate 168. The heat exchanger 130, which for example may be air or water cooled, is shown in the marine embodiment, and receives open water by way of a pump 190 (FIG. 3) to exchange refrigerant heat in the heat exchanger 130. The accumulator 123 is shown near the compressor 120 and the vibration isolator 125 is disposed fluidically between the compressor 120 and the accumulator 123 to isolate vibration of the compressor 120 from the remainder of the refrigerant fluid conduits. An expansion valve 140 is disposed adjacent to the condenser 130 to reduce pressure before the refrigerant enters the evaporator 150. The expansion valve 140 may be an electronic expansion valve, but in some other embodiments, a capillary tube or other device for reducing pressure may be utilized within the scope of the instant embodiments.

The fan or blower 154 is disposed on the backside of the depicted embodiment. One of the covers includes a central aperture which pulls air across the evaporator 150 and subsequently conditions the air. The conditioned air is then blown from the fan 154 to a duct and into a room or zone. The blower 154 may include a blower outlet ring 169 for connection of ducting. Although shown in one position, the position of the outlet ring 169 may be rotated about the axis of the fan 154, in order to improve mounting options.

Shown located within the condenser conduit 130, is a reversing valve 180. The reversing valve 180 allows the change of fluid direction so that the air conditioning system 100 can function as a heat pump.

The electric box 163 is shown exploded from the second shroud 166 and may contain the controller 400 (FIG. 6), described further herein. The electric box 163 may be mounted to the body 160, for example the second shroud 166, or it may be mounted remotely. The electric box 163 may include a wireway 163a, such as one or more apertures, through which the tether 161 may be positioned through to allow for the remote mounting.

It should be understood that the air conditioning system 100 depicted in the drawings of FIGS. 4, 5 provides a marine air conditioning system. However, the cooling mechanicals 110 shown and described may be placed in a different body, with the substitution of a condenser heat exchanger, in order to define a system that can be used with a land-based recreational vehicle as in FIG. 2.

Figure 6:
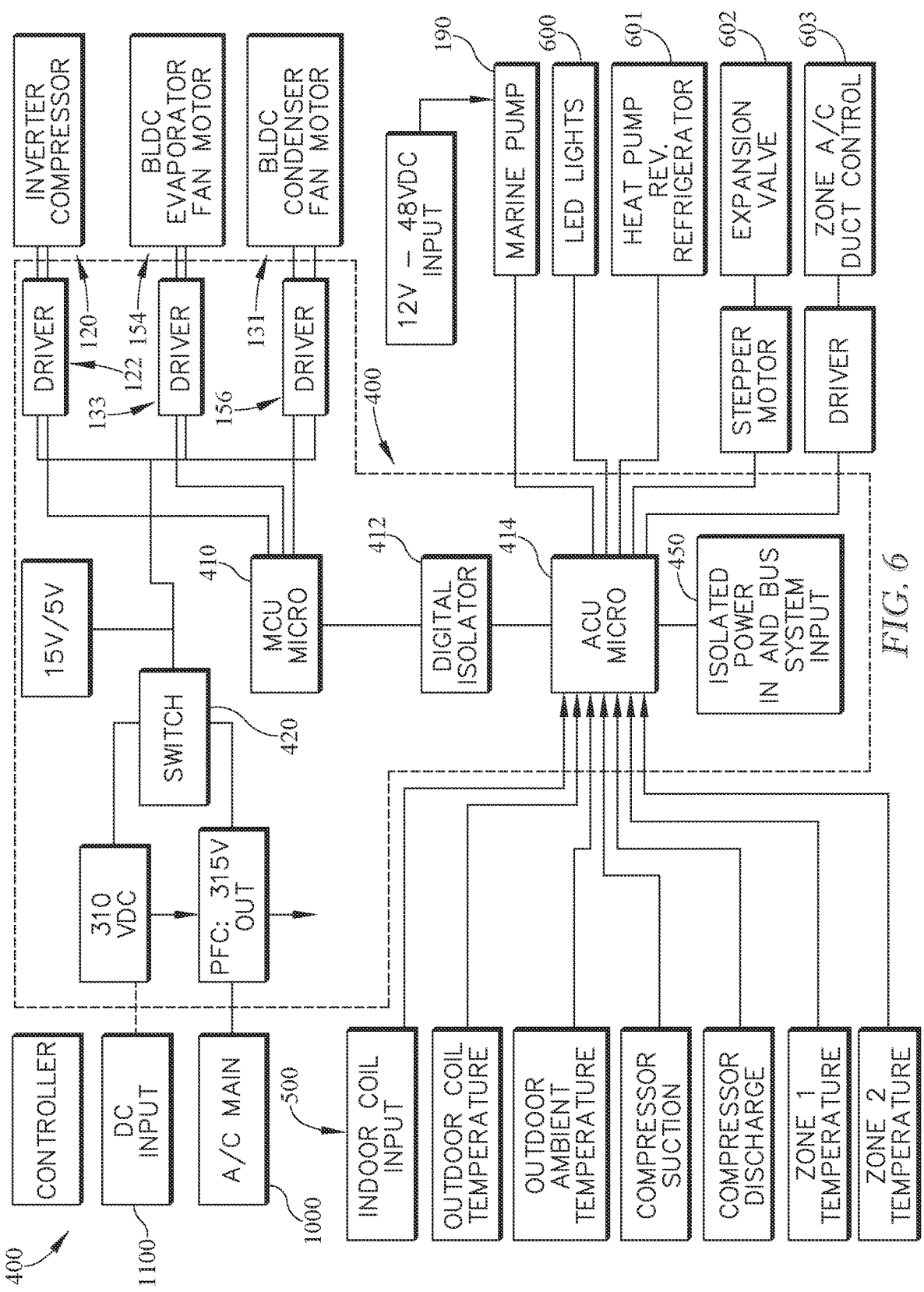
FIG. 6 is a schematic view of a circuit layout of a controller.
Figure 7:
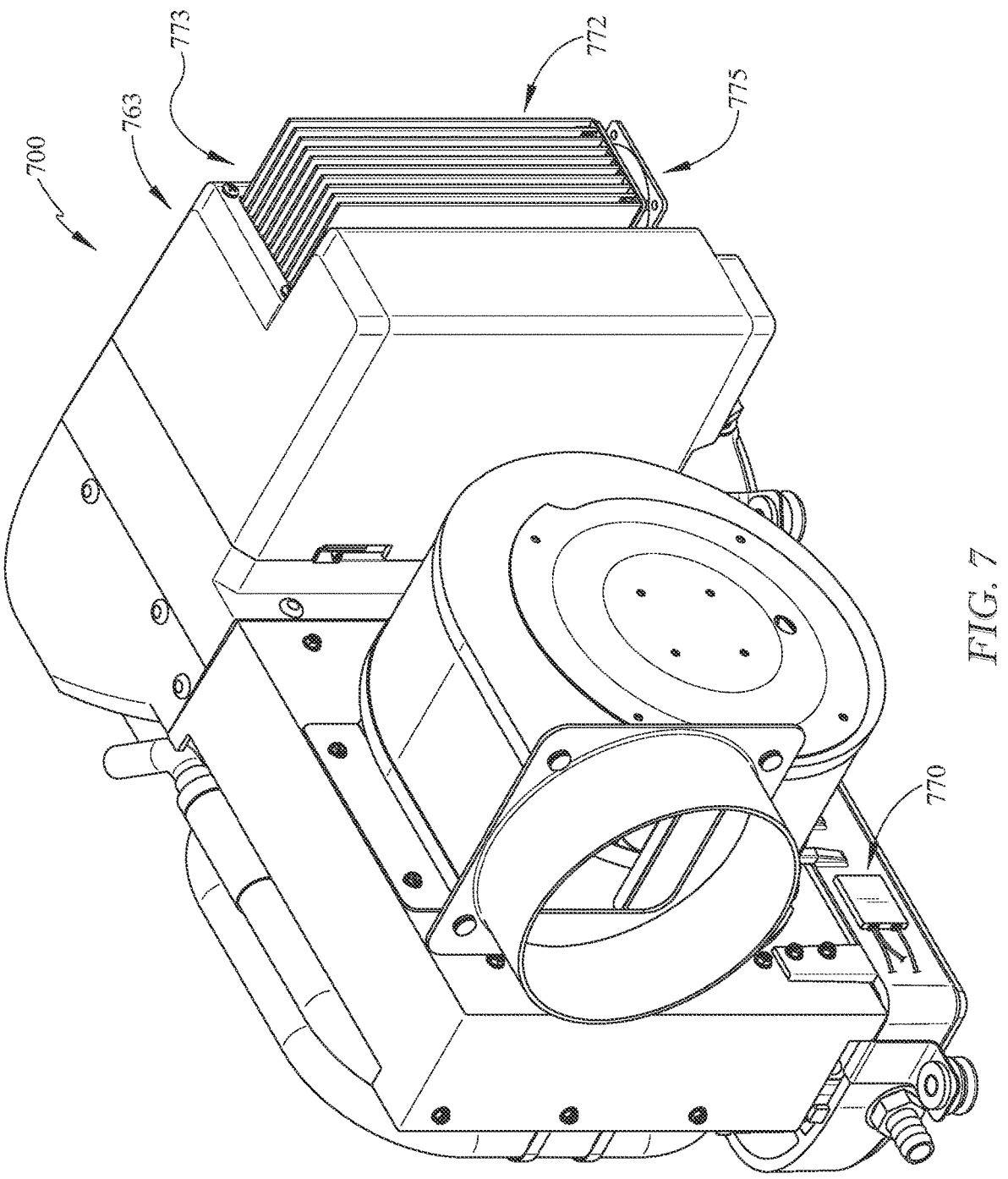
FIG. 7 is an upper perspective view of an alternate air conditioning system.

Referring now to FIG. 6, a schematic view depicts a controller 400 which may be used to operate multiple motors in a coordinated fashion. As noted before, each air conditioning system 100 may comprise two or more motors generally represented by the inverter compressor (motor) 120, the evaporator fan motor 154, and the optional condenser fan motor 131 depending on whether the device is air cooled or water cooled. The controller 400 coordinates the operation of the motors 120, 131, and 154 based upon the inputs provided to the controller 400. Further, as noted previously, the controller 400 may be located in an electric box 163 (FIG. 5) which may be positioned on the main body 160, or remotely with the use of a tether. Each of the motors 120, 131, and 154 comprises a respective driver 122, 133, 156 which may be on-board the controller 400 or may be onboard the corresponding motor. Each driver may comprise a sinusoidal control with a microcontroller (MCU) for motor control. The driver may have embedded software to perform various functions for the motor and its control. For example, based on voltage and current signals, the driver may solve mathematical equations of a control algorithm and generate a required pulse with modulation control signal for spinning the motor. The driver may also amplify the PWM signal and apply them to a three phase bridge, which delivers the required voltage and current to the motor.

The controller 400 may operate the compressor 120 (motor), the one or more evaporator fan 154 (motors), and an optional condenser fan 131 (motor). The controller 400 may be defined by, without limitation, a printed circuit board and one or more microprocessors, for example a motor control unit 410 and an appliance control unit 414. In some embodiments, the controller 400 may comprise the motor controller unit (MCU) 410 which comprises a plurality of power inputs including both of AC and DC inputs. The motor control unit 410 may comprise input for power from a mains AC voltage source 1000, for example as shore power for a docked marine craft or at a campground in the recreational vehicle example. The mains voltage power 1000 may be in a range of from about 100V AC power to about 240V AC power service. The AC power source 1000 may also vary in frequency, for example 50 or 60 Hertz, and the controller 400 may make such frequency determination. The controller 400 may filter the mains AC power source 1000 and have a power factor correction circuit wherein efficiencies and the power savings may be achieved. After the filtering and correction, the mains AC power source 1000 may also be boosted up, or stepped up, by the power filter correction (PFC) circuit to the desired value, for example 310V to power the compressor 120 and fan motors 131, 154.

The controller 400 may also have a DC voltage input 1100, which may also be referred to as a DC bus. The DC voltage input 1100 may have various sources, including house battery power which may be from 12V DC to 48V DC, an electric vehicle battery source which may be 300-380V DC, or other sources. For example, the one or more DC voltage inputs may be capable of receiving power input in a range of from 12V DC to about 380V DC input. These may include, but are not limited to, for example one or more combustion engine vehicle batteries, solar power, or electric vehicle power supply. Further, the DC voltage that is below 310V DC may be boosted up to a desirable voltage. On this side of the controller 400, the power is boosted from input voltage up to 310V DC, or some variation from 310V DC, and therefore it is separated from the other side of the controller 400 by a digital isolator 412. It may be desirable for example to separate high voltage side of the controller 400 from the lower voltage, for safety reasons.

In some embodiments, the controller 400 comprises the switch 420 that makes a determination of whether the input is from AC or a DC source and auto-selects the type of input. In this instance, the switch 420 may also have a default selection, for example to AC power, if both AC and DC sources are present.

With the wide range of AC and DC power inputs available to the controller may have an auto-select function to decide between AC power 1000 and DC power input 1100. Additionally, the controller 400 may also auto-tune for the specific available power of either the AC or DC input. The control may use Trapezoidal speed control to adjust the output power of the motors 120, 154, 131 to compensate for what the available system power is. This available system power can either be a configuration or a dynamic system message received over the data bus. A non-limiting example of the configuration message could be an RV manufacturer selecting a 20 A service to the air conditioner and even though the air conditioner is capable of delivering more power than 20 A can provide it. The controller 400 will derate the output power for this input current. The term "derate" simply means not using the full capacity of a device. An example of the dynamic messaging may relate to a message sent of the data bus that a module is running out of power. For example, one scenario may be that a solar power controller of a solar module sends a message to the air conditioner controller 400 that the panels are no longer outputting as much power. The air conditioner controller 400 can respond by derating its output to match the available power the sun is providing. This reduction may be represented for example by a reduction in motor speed and therefore cooling capacity.

Still further, the controller 400 may receive an input from a generator which may be a standalone unit or may be powered by an engine of the vehicle.

The controller 400 also comprises motor control unit 410 communication with the inverter compressor 120, the evaporator fan 154 motor, and the optional condenser fan 131 motor in some embodiments. The inverter compressor 120 allows for the variable speed motor to change the speed and therefore the variable capacity of the compressor. Further, therefore the variable speed compressor provides improved efficiency via speed control of the controller 400. The motor control unit 410 may be defined by a microprocessor disposed on the controller 400. The evaporator fan 154, the condenser fan 131 (if utilized), and the inverter compressor 120 having a variable speed motor each have a power input and a control signal from the motor control unit 410. Thus, the one or more motors are each controlled by the controller 400.

Below the motor control unit 410 is the digital isolator 412. It may be desirable to electrically separate the components of the air conditioning system 100 which operate at high voltages from the components that operate at lower voltages. Accordingly, the isolator 412 may be provided between the motor control unit 410 and an appliance control unit 414. The appliance control unit 414 may be defined by a microprocessor which may be the same or differ from the motor control unit 410. In the instant embodiment, the appliance control unit 414 may be in communication with various lower voltage "appliances" or services being controlled by, or communicated to, the appliance control unit 414. The appliance control unit 414 may receive temperature inputs 500, make behavioral determinations for the air conditioning system 100 and function to provide the CAN messaging.

On an opposite side of the appliance control unit 414, additional features may be provided. For example, in the embodiment where a condenser fan is not used, but instead a marine pump is utilized for a water cooling or heating process, a 12V-48V DC input may be provided for a marine pump. The appliance control unit 414 may provide speed control of the marine pump 190 with, for example, a pulse width modulation signal to the marine pump 190 (see also FIG. 3). Other DC drivers 600, 601, 602, 603, may be provided on the controller for LED lights, heat pump control, expansion valve control, 220 VAC pump control, electric supplemental heat, or air conditioning flow direction with ducting valves.

In some embodiments, a low voltage DC input may be provided. For example, the 12V DC power supply may be provided on to the ACU 414. The 12V DC input may be provided which provides power to a CAN BUS, LIN BUS or may be stepped down in voltage (5V) for various sensors, such as ambient temperature, coil temperature-indoor and/or outdoor, zone temperatures, and other sensory inputs, generally shown at 500.

An auxiliary input 450 may also be provided for power in and/or future or unspecified inputs to the appliance control unit 414. For example, this may allow for new additional features to be provided to the system in the future without requiring an entirely new control system. Still further, the input 450 may also receive input from BUS systems which provide control to different modules of the system: for non-limiting example solar panels, battery packs, user interface for the one or more air conditioners, and other modules. Modules can be defined by any feature or function that also maybe controlled by the controller 400 or provide input to the controller. The BUS input may provide control parameters to the appliance control unit 414. For example, the BUS may provide remaining battery power information to the ACU 414 which indicates a decrease in available power over a period of time, or instantaneously. In either event, the controller 400 may make a determination that power output by the inverter compressor 120, or the fan motors 154, 131 need to be decreased to preserve power. Further, for example, the BUS may provide user input information, such as a nighttime setting or an economy mode, either of which may reduce power output of the air conditioner. Still further, the BUS may provide information related to solar power input, for example indicating that less sunlight is available and therefore that power output should be decreased, again to conserve battery power. Similarly, the BUS input may also provide information that the air conditioner power output may be increased, such as when batteries are fully charged, full sunlight is available or when eco or nighttime mode settings are turned off.

In this way, the controller 400 also provides for multi-motor coordination. When the inputs provide that the power out by the motors should be decreased, for example for lower input power at the batteries, reduced sunlight during solar power operation, or during nighttime or eco settings, the controller 400 coordinates motor operation for the motors 120, 154, and 131. The controller 400 can therefore reduce power output, or speed, of the motors as needed under lower power conditions, and the controller 400 can raise power output by increasing speed as needed as well.

In a further example, when the user interface is set to an eco-mode or night-time mode, or any mode requiring low power consumption the controller 400 also coordinates all the motors to decrease output for example to a desired power curve for the air conditioner. For example, in a low power mode, a preselected power curve may be provided which decreases the power output, or speed, of each motor in a preselected way in order to increase operation time based on existing power availability. In this way, all the motors 120, 154, 131 may be coordinated in order to increase the operation time. The power curve may be mathematically programmed in onboard memory of the controller or firmware and may represent a sum of the curves related to each individual motor 120, 154, 131.

Referring to FIG. 7, an alternate air conditioner (HVAC) 700 is provided in an upper perspective view. The alternate embodiment provides numerous similar components to the previous embodiment and therefore will not be repeated here, but instead are incorporated by reference.

The present embodiment provides an electric box 763 which is of differing shape. In this embodiment, the electric box 763 is notched, when viewed from the upper perspective or top view, and has a heat sink 772 located in a notch or space 773 defined by the electric box 763. In this embodiment, a fan 775 is disposed adjacent to the heat sink 772, to force air over fins of the heat sink. Accordingly, the electric box 763 may take various forms depending on the heat output from the controller and may have various manners of reducing such heat.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. An air conditioning device for a vehicle including:
a main body;
a blower including an inlet and an outlet, the blower further including blades rotating therein;
a compressor located on said main body;
a variable speed motor operably connected to said compressor, said variable speed motor driving rotation of said compressor;
a refrigerant conduit in fluid communication with said compressor;
an evaporator positioned on said main body, said evaporator in fluid communication with said compressor and in air communication with the inlet of said blower;
a heat exchanger in fluid communication with said refrigerant conduit, said compressor, and said evaporator, said heat exchanger being a coil-in-coil open water heat exchanger;
at least one additional motor;
a controller having a dual voltage input for alternating current (AC) and direct current (DC), said controller operating said variable speed motor and said at least one additional motor.

2. The air conditioning device of claim 1, said controller further comprising auto selection between line AC voltage and DC voltage that is supplied.

3. The air conditioning device of claim 2, said line AC voltage being 100V AC-240V AC and in 50 or 60 HZ.

4. The air conditioning device of claim 2, said DC voltage being from any one of 12V DC, 24V DC, 48V DC, or 350-380V DC.

5. The air conditioning device of claim 4, said DC voltage being between about 350-380V DC directly connected to said dual voltage input.

6. The air conditioning device of claim 1, wherein when both AC voltage input and DC voltage input are available, said controller defaults selection to AC voltage.

7. The air conditioning device of claim 1 further comprising an inverter in electrical communication with said variable speed motor, said inverter capable of two mounting locations: remote mounted from the compressor or mounted to a chassis.

8. The air conditioning device of claim 7, further comprising a tether to remote mount the inverter spaced from the compressor.

9. The air conditioning device of claim 7, said controller located proximate to said compressor on said main body.

10. The air conditioning device of claim 1, further comprising an expansion valve to regulate refrigerant flow.

11. The air conditioning device of claim 1 further comprising a reversing valve to reverse refrigerant flow and provide heat.

12. The air conditioning device of claim 1, further comprising a refrigerant in fluid communication with said heat exchanger.

13. The air conditioning device of claim 1, said heat exchanger having at least some titanium components.

14. The air conditioning device of claim 1, wherein a drain pan defines a portion of said main body.

15. The air conditioning device of claim 14, further comprising a condensate sensor in said drain pan.

16. The air conditioning device of claim 14, said main body further comprising one or more covers on said drain pan.

17. The air conditioning device of claim 1, said vehicle being a nautical vehicle.

18. An air conditioning device for a vehicle comprising:
a main body;
a blower including an inlet and an outlet;
a compressor located on said main body;
a variable speed motor operably connected to said compressor, said variable speed motor driving rotation of said compressor;
a refrigerant conduit in fluid communication with said compressor;
an evaporator positioned on said main body, said evaporator in fluid communication with said compressor and in air communication with the inlet of said blower;
a heat exchanger in fluid communication with said refrigerant conduit, said compressor, and said evaporator, said heat exchanger being a coil-in-coil open water heat exchanger to exchange heat of a refrigerant with open water;
a dual voltage input for alternating current (AC) and direct current (DC);
an auto-tuning function which selects output power based on available input power.

* * * * *